United States Patent [19]

Chaney, Jr.

[11] Patent Number: 4,486,514

[45] Date of Patent: Dec. 4, 1984

[54] HERMETICALLY SEALED GALVANIC CELL HAVING SAFETY VENT CONSTRUCTION

[75] Inventor: Earl J. Chaney, Jr., Medina, Ohio

[73] Assignee: Union Carbide Corporation, Danbury, Conn.

[21] Appl. No.: 595,365

[22] Filed: Mar. 30, 1984

[51] Int. Cl.³ ............................................. H01M 2/12
[52] U.S. Cl. ......................................... 429/56; 429/82; 429/89; 429/174; 429/181; 429/185; 429/196
[58] Field of Search ....................... 429/53, 54, 55, 56, 429/82, 89, 83–88, 196, 171, 173, 174, 181–185

[56] References Cited

U.S. PATENT DOCUMENTS

| | | | |
|---|---|---|---|
| 4,115,629 | 9/1978 | Dey et al. | 429/56 |
| 4,127,702 | 11/1978 | Catanzarite | 429/181 X |
| 4,233,372 | 11/1980 | Bro et al. | 429/181 X |
| 4,437,231 | 3/1984 | Zupanui | 429/53 X |

*Primary Examiner*—Charles F. LeFevour
*Attorney, Agent, or Firm*—William E. Dickheiser

[57] ABSTRACT

An hermetically sealed galvanic cell having a safety vent assembly comprising a housing having a portion which is inwardly depressed and flexible, which portion surrounds an aperture. The aperture is filled with a layer of glass or ceramic material thus producing an hermetically sealed cell which exhibits increased mechanical strength coupled with reliable venting.

12 Claims, 4 Drawing Figures

HERMETICALLY SEALED GALVANIC CELL HAVING SAFETY VENT CONSTRUCTION

FIELD OF THE INVENTION

This invention relates to a galvanic cell comprising a housing having a safety vent defined therethrough, said vent being hermetically sealed with a layer of glass or ceramic material. Said cell is further characterized in that at least that portion of the housing which is located about said vent is inwardly depressed and flexible. This construction affords such hermetic seal with increased mechanical strength coupled with reliable venting.

BACKGROUND OF THE INVENTION

It is well known in the art of galvanic cell construction that certain cell systems, such as the lithium/oxyhalide cell system or the lithium/manganese dioxide cell system, and certain cell applications preferably require a hermetically sealed housing and, therefore, generally cannot utilize the resealable seals or vents known in the battery art.

Specifically, cell systems employing lithium, high vapor pressure organic solvents and inorganic liquid cathode/solvent materials are required to be hermetically sealed in order to prevent the exposure of the highly reactive and corrosive cell materials to the outside environment and to provide superior shelf life. The disadvantage or danger of utilizing a non-venting hermetic seal is that with the buildup of internal pressure within a cell, the force could reach a level that could cause the cell to disassemble. Although seals utilizing plugs that are ejected or melt after a predetermined pressure buildup or temperature level is reached have been employed with some success, they may not, in all cases, provide the quality of seal having the required hermeticity for the cell systems referred to above.

In consequence, hermetic seals or vents employing glass or ceramic materials have been employed in the past. For example, U.S. patent application No. 519,208 filed Aug. 1, 1983 discloses an hermetic seal for electrochemical cells comprising a flexible metallic cover sealed to the open end of a container housing the cell components. Such flexible cover has a radially inwardly disposed flange defining an opening through which a conductive terminal of the cell passes. The terminal is hermetically sealed to the cover by a layer of glass or ceramic material bonded to both the flange and the terminal. The flexible cover is formed such that a predetermined pressure buildup within the cell will cause the cover to flex sufficiently so as to fracture the glass or ceramic material, the bond between the cover and the glass or ceramic material, or the bond between the terminal and the glass or ceramic material, thereby forming a vent passage from the cell.

U.S. Pat. No. 4,233,372 discloses an hermetic glass-metal seal for electrochemical cells having a metallic central feedthrough which is sealed to a metal eyelet by a glass-to-metal seal. However, this seal is not intended to have a venting function.

U.S. Pat. No. 4,115,629 discloses a cell closure which includes a flexible metal member which has an aperture of predetermined area over which a non-polarized metallic disc of a size larger than the aperture is symmetrically positioned. A glass or ceramic layer hermetically bonds said disc over the aperture. The wall structure of this hermetic bond is formed so that a predetermined gas buildup within the cell will cause the wall to rupture thereby venting the gas from the cell.

U.S. Pat. No. 4,127,702 discloses a self-venting battery wherein an insulating material such as glass or ceramic is provided between and bonded to the terminals for electrically insulating them from one another and wherein the insulator is such that increasing pressure within the battery will cause the insulator to crack a sufficient amount to vent the pressure in the battery before causing the bond between the insulator and terminals to fail.

Hermetic seals which employ glass or ceramic materials and which are to serve a safety vent function desirably exhibit two characteristics, to wit: (1) good mechanical seal strenght; and (2) the ability to retain their hermeticity until a predetermined pressure has been reached and then to vent quickly upon encountering such pressure.

As is employed herein mechanical seal strength is defined as the outwardly directed force required to break the glass-to-metal or ceramic-to-metal bond. The desirability of good mechanical seal strength stems from the brittle nature of the glass or ceramic materials typically employed. Such brittleness may cause the seal to break during cell assembly as a result of the mechanical forces exerted on the seal during such assembly. Consequently, good mechanical seal strength is desirable in order to minimize the amount of scrap produced during cell manufacture.

Because a loss of the integrity of the hermetic seal may render a cell unmarketable or even damage the device in which the cell is inserted, it is desirable that an hermetic seal not vent at pressures well below that of said seal's predetermined venting pressure. Conversely, the structure of such seal should be such that the cell may vent quickly when the pressure inside the cell reaches such a predetermined limit in order to avoid disassembly of the cell. Thus it is important that a venting aperture be opened as quickly as possible once such critical pressure has been reached.

Accordingly, it is an object of this invention to provide a galvanic cell having a hermetic seal which seal possesses enchanced mechanical seal strength.

It is a further object of this invention to provide a galvanic cell having an hermetic seal which seal will permit excess pressure to be rapidly released from the cell's interior when pressure inside such cell exceeds a predetermined pressure.

The foregoing and additional objects will become more fully apparent from the description hereinafter and the accompanying drawings.

SUMMARY OF THE INVENTION

This invention relates to a galvanic cell comprised of a housing, said housing comprising a first portion having at least one aperture therethrough and extending about said at least one aperture, and a layer of glass or ceramic material disposed within said at least one aperture and bonded to said first portion of said housing so as to hermetically seal said at least one aperture; characterized in that said first portion of said housing is inwardly depressed and flexible such that when the internal pressure of said cell exceeds a predetermined limit said inwardly depressed first portion of said housing will flex outwards thereby fracturing the hermetic seal and providing a vent passage from the cell.

As is employed herein the term "inwardly depressed" encompasses portions of the cell housing which possess a dish-shaped or sloped planar contour, which slope is in the direction of the interior of the cell. This contour preferably possesses an average slope of between about 2° and about 10° from the horizontal and most preferably possesses a slope of between about 5° and about 7.5° from the horizontal. The use of such an inwardly depressed portion of the housing affords a mechanical means for reliably activating the vent as such portion acts as a lever to force open at least a portion of the bond at the interface of the housing and the glass or ceramic layer once the desired predetermined pressure has been reached. Thus, although some incidental fracturing of the glass or ceramic material may occur, the outward flexing of the inwardly depressed portion of the housing will cause the glass or ceramic-to-metal bond to initially break thus quickly providing a venting passage from the cell's interior. This flexing will enable the cell to rapidly vent the excess pressure and thus prevent disassembly of the cell. The inwardly depressed portion may encompass two or more distinct portions of the cell housing where more than one venting aperture is employed. The housing of the cell of this invention preferably comprises a cover and a container with the inwardly depressed portion being defined in said cover.

As employed herein the term "layer" as applied to the glass or ceramic material refers to a solidified body or mass of suitable shape to fill and hermetically seal the at least one aperature.

The inwardly depressed portion of the housing utilized in the cells of this invention can be composed of any material which possesses sufficient flexibility such that said housing portion will deform at the preselected venting pressure, which portion is bondable to the glass or ceramic material, and preferably which portion is chemically inert to the materials inside the cell. (As is apparent to those skilled in the art, where the housing portion is composed of a material which is not chemically inert to the materials inside the cell such portion must be coated or otherwise treated with inactive material prior to its assembly into the cell.) Illustrative of the materials which may be employed are stainless steel, cold-rolled steel, and the like.

Any suitable glass or ceramic composition may be used in the hermetically sealed safety vent construction employed in the cells of this invention. Such seals may be either of the matched or compression variety. As is employed herein the term "matched" when used in reference to a seal refers to seals wherein the coefficient of expansion of the glass or ceramic material suitably corresponds to the coefficient of expansion of the material of which the housing portion is composed. The term "compression" refers to seals wherein the coefficient of expansion of the housing portion material is greater than the coefficient of expansion of the glass or ceramic material. Suitable glass materials include, for example, borosilicate glasses, such as type 203KN obtained from Glass Beads Co., aluminosilicate glasses, sodium silicate glasses and the like. Suitable ceramic materials for use in this invention include those containing alumina or beryllia as a major ingredient.

The glass or ceramic layer can extend outside the inwardly depressed portion of the cell housing, inside the inwardly depressed portion of the cell housing, or both inside and outside. Constructions with glass located both inside and outside tend to vent at higher pressures than constructions having glass only on the outside.

It is within the scope of this invention to have a terminal extending through the at least one aperture, said terminal being bound to the glass or ceramic material. In cell constructions wherein the cell container/cover assembly functions as a second terminal, the glass or ceramic material serves the further purpose of electrically insulating the terminal extending from the cover/container assembly. Further, said terminal may be in the form of a hollow tube which functions as an electrolyte fill tube prior to its being sealed when cell assembly is complete.

In designing the cell of this invention so that such cell will vent at a predetermined pressure, several factors must be taken into account. Illustrative of these factors are the cover thickness, the contour of the inwardly depressed portion, the distribution of the glass or ceramic material and the size of the glass or ceramic (cross-sectional area) layer.

The cells of this invention employing the above-described hermetic seal exhibit several benefits. In certain cell systems, such seal design permits rapid venting, thereby allowing gasses to escape before the anode (lithium) melts and reacts in a highly exothermic reaction with the cathode materials. The contoured portion aids in venting ease and reliability as it provides a mechanical means of activating the vent and also improves the mechanical strength of the seal.

BRIEF DESCRIPTION OF THE DRAWING

The present invention will become more apparent from the following description thereof when taken together with the accompanying drawing which is set forth as being exemplary of the present invention and is not intended to be in any way limitative thereof and wherein.

DETAILED DESCRIPTION OF THE DRAWINGS

Figure 1:
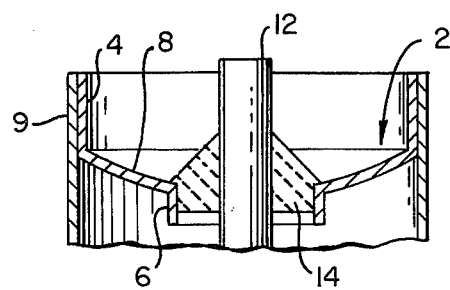
FIG. 1 is a sectional elevational view taken through one preferred embodiment of a cover seal assembly for use in the cell of this invention wherein a cover having an inwardly depressed dished contour is employed.

FIG. 1 shows a sectional elevational view taken through one embodiment of a cover seal assembly for use in the cell of this invention wherein a cover having an inwardly depressed dished contour is employed. Cover 2 is comprised of depending peripheral skirt 4, depending inner flange 6 and inwardly depressed dish-shaped portion 8. Peripheral skirt 4 is welded or otherwise sealed to cell container 9. Although peripheral skirt 4 is shown as ascending and inner flange 6 is shown as depending, it is within the scope of this invention to have one or both of these members in an ascending, depending, or ascending and depending configuration. Inwardly depressed portion 8 has at least one aperture extending therethrough. Although inwardly depressed portion 8 of cover 2 is shown as encompassing the entire covering portion of the cover, such portion need only extend about the at least one aperture. Moreover, it is within the scope of this invention to provide more than one aperture in cover 2, with either a contiguous or noncontiguous section of inwardly depressed portion 8 extending about said at least one other aperture. Inwardly depressed dish-shaped portion 8 is of a contour such that its average slope is preferably between about 2° and about 10°, most preferably between about 5° and about 7.5°, from the horizontal and is composed of a material which will flex outward when the interior pressure of the cell exceeds a predetermined limit. Extending through the at least one aperture is terminal 12, which may also function as a fill tube. Glass or ceramic layer 14 surrounds terminal 12 and electrically insulates it from cover 2.

Figure 2:
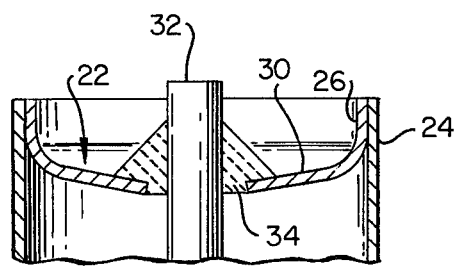
FIG. 2 is a sectional elevational view taken through a second preferred embodiment of a cover seal assembly for use in the cell of this invention wherein a cover having an inwardly depressed planar contour is employed.

FIG. 2 shows a sectional view through a second preferred embodiment of a cover seal assembly of the cell of the present invention employing a cover having an inwardly depressed planar portion. Cover 22 is comprised of peripheral skirt 26 and inwardly depressed planar cover portion 30. Peripheral skirt 26 is welded or similarly sealed to the open end of cell container 24. Although peripheral skirt 26 is shown ascending, such skirt could, optionally, be depending or both depending and ascending. Terminal 32, which could function as a fill tube, extends through an aperture defined by inwardly depressed sloping portion 30. Cover portion 30 is preferably inwardly sloping at an angle of between about 2° and about 10°, most preferably between about 5° and about 7.5° from the horizontal, and is composed of a flexible material. Portion 30 need only extend about the aperture and does not have to extend across the entire covering portion of cover 22. Glass or ceramic layer 34 surrounds and electrically insulates terminal 32 from cover 22. If desired, glass layer 34 could additionally extend below the surface of cover portion 30.

Figure 3:
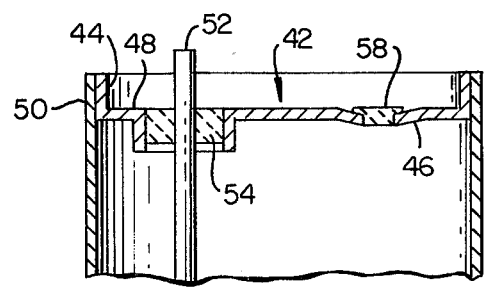
FIG. 3 is a sectional elevational view taken through a third embodiment of a cover seal assembly for use in the cell of this invention wherein a terminal extends through a conventional glass-to-metal or ceramic-to-metal seal and wherein a safety vent comprising an inwardly depressed portion of the cover is additionally employed.

FIG. 3 shows a sectional elevational view of a third embodiment of a cover seal assembly comprising a conventional glass or ceramic seal about the terminal and a safety vent assembly comprising an inwardly depressed cover portion. Cover 42 comprises ascending peripheral skirt 44, inwardly depressed portion 46 and horizontal cover portion 48. Ascending peripheral skirt 44 could alternatively be depending or ascending and depending and is welded or similarly bonded to the open end of cell container 50. Cell cover 42 defines an orifice through which is extended terminal 52, which may also function as a fill tube. First glass or ceramic layer 54 hermetically seals the orifice and electronically insulates terminal 52 from cover 42. Inwardly depressed portion 46 of cover 42 defines a venting aperture. Portion 46 preferably slopes inward at an angle between about 2° and about 10°, most preferably between about 5° and about 7.5°, from the horizontal. The aperture is sealed by second glass or ceramic layer 58, and functions as a venting aperture.

Figure 4:
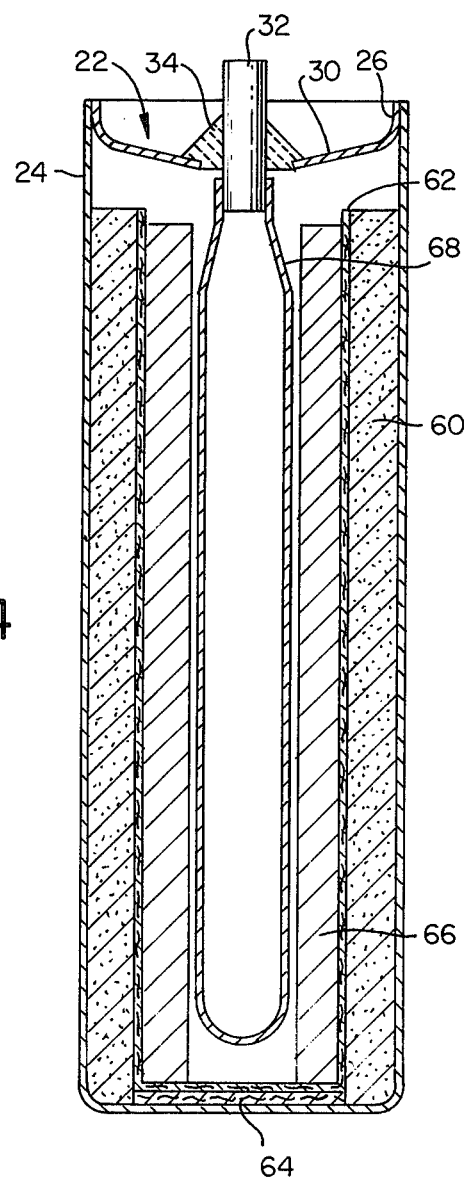
FIG. 4 shows a sectional elevational view taken through a fully assembled galvanic cell employing the hermetic seal of FIG. 2 in accordance with this invention.

FIG. 4 shows a sectional elevational view taken through a fully assembled galvanic cell employing the cover construction of FIG. 2. As has been discussed above, cover 22 is comprised of peripheral skirt 26 and inwardly depressed portion 30 which defines an aperture. Peripheral skirt 26 is welded to the open end of cell container 24. Extending through the aperture is terminal 32. Glass or ceramic layer 34 surrounds and electrically insulates terminal 32 from cover 22 while hermetically sealing the aperture.

Disposed within the cell container 24 is cathode collector shell 60 in contact with the container 24 thereby adapting the container as the cathodic or positive terminal for the cell. Disposed within and in contact with the inner circumference of cathode collector 60 is a separator 62 and bottom separator or disc 64. If desired, the cathode collector material could be extruded within the container 24, rolled with the can material or composed of one or more segments to form a cylindrical tube and then placed in the can. Disposed within the cylinder formed by separator 62 and in contact therewith is anode 66. Disposed within the central cavity formed by anode 66 is spring current collector 68, which is in electrical contact with terminal 32.

In the above described cell several design modifications could be made. Thus for example, the anode and cathode collector could be interchanged such that the anode would be disposed adjacent the inner wall of the cell container and the cathode collector would be disposed within the anode and separated therefrom by a suitable separator as described above.

Now that the components and construction have been described, the mode of operation of the safety vent assembly of the cell of this invention may be explained. The buildup of excess pressure within the cell will cause inwardly depressed portion 30 of cover 22 to flex upward. This flexing will cause the cover to act as a lever, fracturing the glass-to-metal or ceramic-to-metal bond between glass or ceramic layer 34 and cover 22. In consequence, a vent path will be formed through the aperture, which vent path will permit the rapid release of such excess pressure before disassembly of the cell can occur.

EXAMPLES

The following examples are illustrative of the present invention and are not intended in any manner to be limitative thereof.

EXAMPLE 1

In order to test the mechanical seal strength of the safety vent assemblies used in the cells of this invention, several cover seal assemblies employing matched glass-to-metal seals were constructed. These cover seal assemblies were constructed as follows:

Several sheets of 430 stainless steel sheets measuring either 0.007 inch or 0.009 inch thick were formed into covers having an inward slope from the horizontal as indicated in Table 1 below. These covers each measured 0.450 inch in diameter and defined a centrally located aperture 0.112 inch in diameter. A terminal comprising a 0.062 inch diameter 446 stainless steel wire which was 0.285 inch long was extended through the center of said aperture and was bonded to said cover by borosilicate glass 203 KN from Glass Beads Co. This glass layer, which in some covers extended only above the cover while in others extended above and below the cover (see Table 1 below), additionally served to hermetically seal the aperture. The seal strength of the finished cell cover assembly was then measured by exerting an outward mechanical force on the terminal, utilizing an Amtek force gauge, until fracture of the cover-glass bond was observed. During such testing, the cover was held as if welded—i.e. free to flex in the middle with the edges firmly secured. The results of such mechanical seal strength testing are summarized in Table 1.

TABLE 1

| | | MECHANICAL SEAL STRENGTH* | | | | | |
|---|---|---|---|---|---|---|---|
| | | Cover Taper | | | | | |
| Glass Position | Cover Thickness | 0° | 5° | 7.5° | 10° | 15° | 20° |
| Extended above cover only | .007 inch | —[1] | 6 ± 1 (6)[2] | — | 12 ± 4 (10) | — | — |
| Extended above and below cover | .007 inch | — | 22 ± 2 (10) | — | 22 ± 6 (10) | — | — |
| Extended above cover only | .009 inch | 7 ± 2** (10) | 11 ± 3 (10) | 15 ± 4 (10) | 17 ± 4 (10) | 10 ± 6 (10) | 8 ± 2 (4) |
| Extended above and below cover | .009 inch | — | 25 ± 2 (10) | — | 39 ± 1 (10) | — | — |

*In pounds of force applied.
**Second figure is one standard deviation.
[1]"—" Indicates not tested.
[2]Number in parenthesis is number of cover assemblies tested.

The above data indicate that the glass-to-metal safety vent assemblies of this invention which employ inwardly tapered covers possess mechanical seal strength superior to that of comparable assemblies wherein a horizontal cover is employed.

EXAMPLE 2

Several lithium/thionyl chloride cells were constructed employing cover seal assemblies identical to those employed in Example 1. The venting pressure of the cells was determined by puncturing the side of the cell containers and internally pressurizing them with nitrogen until the cover-glass bond fractured. The results of such testing are summarized in Table 2 below.

TABLE 2

| | | LIVE CELL VENT RELEASE PRESSURE (PSG) | | | | | |
|---|---|---|---|---|---|---|---|
| | | Cover Taper | | | | | |
| Glass Position | Cover Thickness | 0° | 5° | 7.5° | 10° | 15° | 20° |
| Extending above cover only | .007 inch | —* | 219 ± 31 (10) | — | 417 ± 24 (3) | — | — |
| Extending above and below cover | .007 inch | — | [343 ± 38][4] 935 ± 186 (10) | — | 450 (10) | — | — |
| Extending above cover only | .009 inch | 340[1] ± 14[2] (6)[3] | 363 ± 41 (4) | 517 ± 47 (3) | 710 ± 10 (2) | 1200 ± 46 (7) | All cells leaked |
| Extending above and below cover | .009 inch | — | [375 ± 130] 833 ± 82 (9) | — | [250 ± 50] 803 ± 9 (10) | — | — |

*"—" Indicates not tested
[1]pressure at which inwardly depressed portion of cover flexed outward and fractured the seal
[2]one standard deviation
[3]numbers in parentheses indicate number of cells tested
[4]numbers in brackets are pressures at which electrolyte bubbles leaking from seal were first noticed ± one standard deviation.

The results above indicate the reliable venting characteristics of the cover seal assemblies of the cell of the present invention which assemblies employ an inwardly depressed housing portion. It is noteworthy that the pressures at which electrolyte bubbles were first noted in cells having glass extending both above and below the cover generally correspond to the venting pressures of the corresponding cover seal assemblies having glass extending above the cover only. It is believed that this indicates that the glass beads placed above and below the cover had not properly fused during the construction of said cover seal assemblies. The above examples indicate that these cell cover seal assemblies are admirably suited for use in lithium/oxyhalide cells.

What is claimed is:

1. A galvanic cell comprised of a housing, said housing comprising a first portion having at least one aperture therethrough and extending about said at least one aperture, and a layer of glass or ceramic material disposed within said at least one aperture and bonded to said first portion of said housing so as to hermetically seal said at least one aperture; characterized in that said first portion of said housing is inwardly depressed and flexible such that when the internal pressure of said cell exceeds a predetermined limit said inwardly depressed first portion of said housing will flex outward thereby fracturing the hermetic seal and providing a vent passage from the cell.

2. The galvanic cell of claim 1 wherein said first portion of said housing is inwardly depressed at an angle of between about 2° and about 10° from the horizontal.

3. The galvanic cell of claim 2 wherein said first portion of said cover is inwardly depressed at an angle of between about 5° and about 7.5° from the horizontal.

4. The galvanic cell of claim 1 wherein said cell is a lithium/oxyhalide cell.

5. The galvanic cell of claim 1 wherein said housing comprises a cover and a container and wherein said cover comprises a first portion having a least one aperture therethrough and which extends about said at least one aperture, and a layer of glass or ceramic material disposed within said at least one aperture and bonded to said first portion of said housing so as to hermetically seal said at least one aperture; characterized in that said first portion of said housing is inwardly depressed and flexible such that when the internal pressure of said cell exceeds a predetermined limit said inwardly depressed first portion of said housing will flex outward thereby fracturing the hermetic seal and providing a vent passage from the cell.

6. The galvanic cell of claim 5 wherein said cover further comprises a peripheral skirt.

7. The galvanic cell of claim 5 wherein said cover further comprises an inner flange.

8. The galvanic cell of claim 5 wherein a terminal extends through the at least one aperture.

9. The galvanic cell of claim 8 wherein said terminal also functions as a fill tube.

10. The galvanic cell of claim 5 wherein said cell is a lithium/oxyhalide cell.

11. The galvanic cell of claim 5 wherein said first portion of said cover is inwardly depressed at an angle of between about 2° and about 10° from the horizontal.

12. The galvanic cell of claim 11 wherein said first portion of said cover is inwardly depressed at an angle of between about 5° and about 7.5° from the horizontal.

* * * * *